United States Patent [19]

Tramposch

[11] 3,812,328

[45] May 21, 1974

[54] CREDIT CARD

[75] Inventor: Herbert Tramposch, Riverside, Conn.

[73] Assignee: Pitney-Bowes, Inc., Stamford, Conn.

[22] Filed: May 31, 1972

[21] Appl. No.: 258,437

[52] U.S. Cl....235/61.12 N, 340/149 A, 235/61.12 M, 235/61.12 R

[51] Int. Cl. .......................... G06k 19/02, G09f 3/02

[58] Field of Search............235/61.12 N, 61.12 R, 61.12 M, 235/61.7 B, 61.11 D, 61.11 E; 340/149 A, 174.1 R; 250/219 DC; 101/369; 117/240; 40/2.2

[56] References Cited

UNITED STATES PATENTS

| | | | |
|---|---|---|---|
| 3,571,799 | 3/1971 | Coker | 340/152 |
| 3,644,716 | 2/1972 | Nagata | 235/61.12 M |
| 3,545,380 | 12/1970 | Comegys | 101/369 |
| 3,683,413 | 8/1972 | Schlaepfer | 340/174.1 R |
| 3,676,644 | 7/1972 | Vaccaro | 235/61.11 D |
| 3,551,202 | 12/1970 | Wright | 117/240 |
| 3,221,428 | 12/1965 | Fischler | 235/61.12 R |
| 3,553,439 | 1/1971 | Dorman | 235/61.12 M |
| 3,586,593 | 6/1971 | Dahl | 235/61.12 R |
| 3,325,632 | 6/1967 | Lilly | 235/61.12 M |

*Primary Examiner*—Daryl W. Cook
*Assistant Examiner*—Robert M. Kilgore
*Attorney, Agent, or Firm*—William D. Soltow, Jr.; Albert W. Scribner; Peter Vrahotes

[57] ABSTRACT

A credit card blank is provided with a machine readable optical bar code that is imprinted on a desired panel area of the card, which panel area is covered by a very thin protective layer of transparent plastic material that is bonded to the adjacent card surfaces so as both to shield the bar code indicia from normal smudging and wear conditions and to facilitate the manual and automatic handling of the card.

1 Claim, 7 Drawing Figures

CREDIT CARD

BACKGROUND OF THE INVENTION

The extended use of credit cards has brought about a need for equipment to automatically read data from such cards. Earlier data systems which required an operator to "eyeball" read a card for pertinent information such as names, numbers, etc., and "insert" this data into a recording and/or computing system via a manually operated keyboard or other functionally similar devices have proven to be too slow and tedious particularly where large numbers of different individual credit cards are to be handled. To this end many attempts have been made to encode credit cards in different ways so as to render them machine readable; for example, cards have been provided with magnetic or optical codes thereon as well as codes embodied in embossures, punched holes, notches, etc., formed in the card. Several difficulties have been encountered when cards are optically encoded, the prime difficulty here involving the tendency of printed code markings on the card to be susceptible to smudge, wear and/or removal by abrasion and other contact forces which are incident to the normal conditions of card storage and handling.

SUMMARY OF THE INVENTION

The primary object of the invention is to provide an improved optically encoded credit card having a protective layer which is secured to the card so as to cover and protect the encoded regions of said card.

A further object of the invention is to provide an improved credit card having a localized area that is provided with bar code indicia, which area is shielded from wear forces and the like by a layer of plastic material which covers said code markings and which is bonded to the adjacent surface areas of the card so as to be substantially flush with the adjacent surface areas of the card.

Other objects of the invention will become apparent as the disclosure progresses.

DETAILED DESCRIPTION OF THE DRAWINGS

Figures 1, 2, 3, 4, 5, 6, 7:
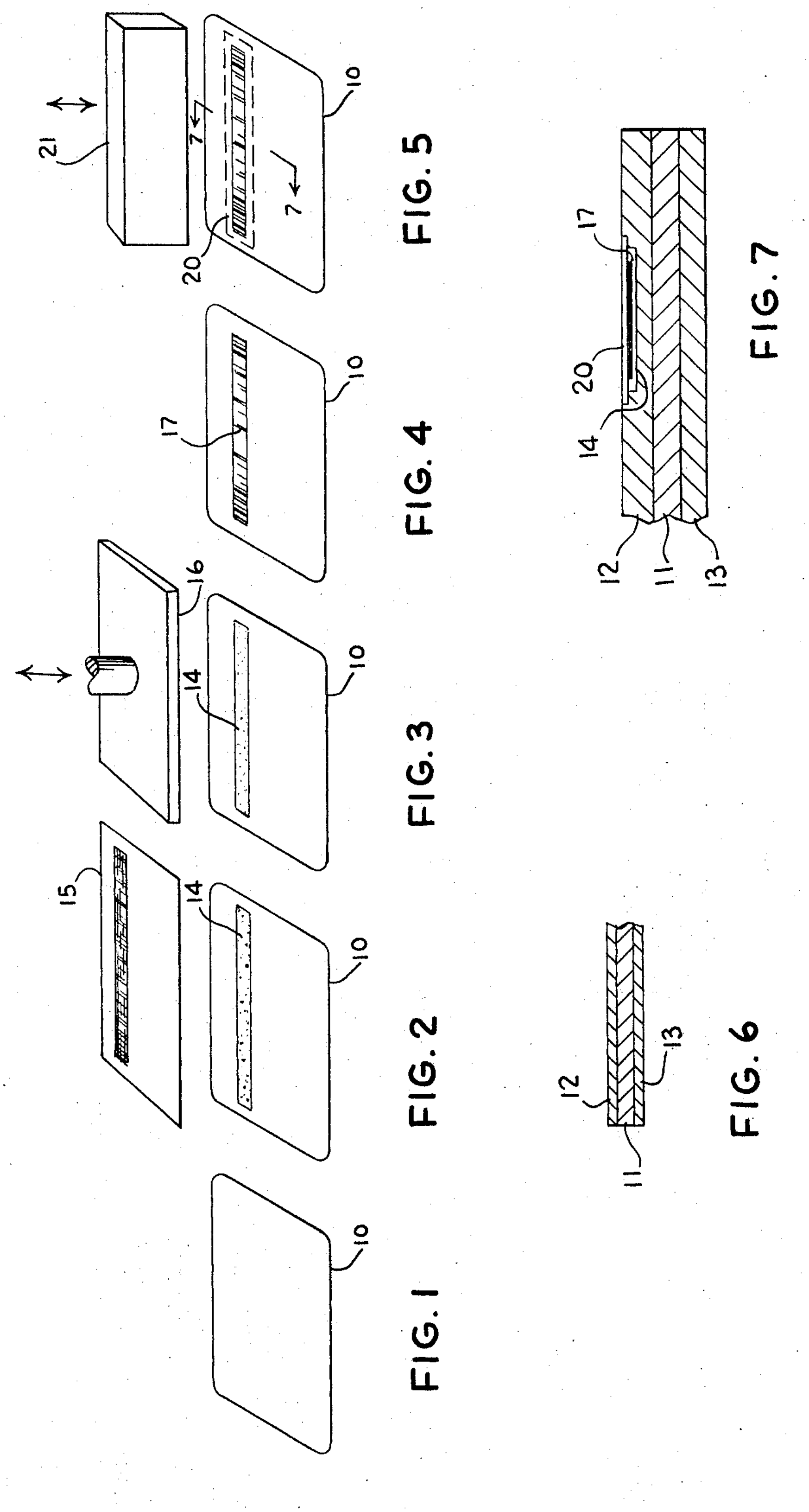
FIGS. 1 through 5 are perspective views of a credit card that is being sequentially treated in the manner to be hereinafter described.
FIG. 6 is a cross sectional view of a fragment of the credit card blank of FIG. 1.
FIG. 7 is an enlarged cross sectional view of a fragment of the credit card as taken along section line 7—7 of FIG. 5.

Referring now specifically to the drawings a brief description will be made of the mode of preparation of the instant credit card and this will afford a clear understanding of the construction of the instant card. In FIGS. 1 and 6 there is shown a standard type credit card blank 10 which is comprised of a polyvinyl chloride (PVC) base layer 11 having two PVC film layers 12 and 13 respectively bonded in a conventional manner to the opposite faces of the base layer 11. To a desired localized stripe area on the upper surface of the card blank 10 there is deposited a layer 14 of "signature panel ink," the composition of this ink material being well-known in the art. The ink deposition step is preferably carried out using a "silk screen" process, as is diagrammatically indicated by the reference numeral 15 of FIG. 2, this process also being well understood in the art. The layer 14 is then pressed into the upper surface of the card blank 10 by a conventional heat polishing step as is diagrammatically indicated in FIG. 3, this polishing step consisting essentially of causing a heated press platen such as is illustrated at 16 to engage the layer 14 and the adjacent area of the card with a pressure and at a temperature which results in the upper card surface being given a continuous smooth polished finish. Under these conditions and due to the composition of the said signature panel ink, the upper surface of layer 14 becomes receptive to various types of marking materials such as solid or liquid inks etc. which may then be applied thereto, using any suitably printing techniques, so as to form on the card a desired machine readable optical bar code which is diagrammatically illustrated at 17 of FIG. 4. After the marking operation of FIG. 4, a transparent layer of plastic material, such as a one-fourth mil thick layer of commercially available vinyl acrylic, is placed over the encoded upper surface of the card, as indicated at 20 of FIGS. 5 and 7, and hot stamped in a conventional manner into the upper surface of card blank 10 as is diagrammatically indicated by reference numeral 21, FIG. 5. Thus the protective layer 20 is bonded to the card surfaces in and/or around the card surfaces defining the signature panel area, the upper surface of layer 20 being made substantially flush with the upper surfaces of the adjacent areas of the card blank 10 as may be seen from FIG. 7. This flush condition will preclude the possibility of the layer 20 from physically catching on any other cards or other objects with which contact may be made during card handling operations.

The resultant credit card is thus encoded with a machine readable optical bar code and the encoded area is covered with a protective layer of transparent plastic material 20 so that the upper surface of the card is smooth and continuous, thus facilitating manual and automatic card handling and affording a long effective readability life for the shielded bar code indicia.

I claim:

1. A credit card comprising:

a plastic card blank;

a portion of the upper surface of said blank having a longitudinal marking panel depressed therein which bears a plurality of machine readable optical code indicia, and a thin protective layer of plastic bonded to a portion of said upper card surface in the immediate vicinity of said marking panel and disposed in overlying relation with respect to said bar code indicia so as to thereby shield said inidicia from normal smudge and wear conditions associated with card handling and storing operations, said protective layer pressed in and forming a flat surface with the remaining said upper surface.

* * * * *

UNITED STATES PATENT OFFICE

CERTIFICATE OF CORRECTION

Patent No. 3,812,328 Dated May 21, 1974

Inventor(s) Herbert Tramposch

It is certified that error appears in the above-identified patent and that said Letters Patent are hereby corrected as shown below:

Column 2, line 56, after "said", delete "bar".

Signed and Sealed this

*twenty-fifth* Day of *May 1976*

[SEAL]

*Attest:*

RUTH C. MASON
*Attesting Officer*

C. MARSHALL DANN
*Commissioner of Patents and Trademarks*